(12) United States Patent
Seki et al.

(10) Patent No.: US 10,108,249 B2
(45) Date of Patent: Oct. 23, 2018

(54) MEMORY CONTROL CIRCUIT

(71) Applicant: Renesas Electronics Corporation, Kawasaki-shi, Kanagawa (JP)

(72) Inventors: Seiji Seki, Tokyo (JP); Masanori Hayashikoshi, Kanagawa (JP); Kiyoshi Nakakimura, Tokyo (JP)

(73) Assignee: Renesas Electronics Corporation, Koutou-ku, Tokyo (JP)

( * ) Notice: Subject to any disclaimer, the term of this patent is extended or adjusted under 35 U.S.C. 154(b) by 32 days.

(21) Appl. No.: 14/242,413

(22) Filed: Apr. 1, 2014

(65) Prior Publication Data
US 2014/0298056 A1 Oct. 2, 2014

(30) Foreign Application Priority Data

Apr. 2, 2013 (JP) ................................ 2013-076689

(51) Int. Cl.
*G06F 1/32* (2006.01)
*G06F 3/06* (2006.01)
(Continued)

(52) U.S. Cl.
CPC .......... *G06F 1/3275* (2013.01); *G06F 1/3225* (2013.01); *G06F 1/3206* (2013.01);
(Continued)

(58) Field of Classification Search
CPC .... G06F 1/3206; G06F 1/3234; G06F 3/0634; G06F 2212/1028; G06F 13/1694
See application file for complete search history.

(56) References Cited

U.S. PATENT DOCUMENTS

| 5,805,849 A | * | 9/1998 | Jordan | .................. G06F 9/3836 |
| | | | | 712/214 |
| 6,108,773 A | * | 8/2000 | Col | ......................... G06F 9/322 |
| | | | | 712/237 |

(Continued)

FOREIGN PATENT DOCUMENTS

| JP | 63-26892 A | 2/1988 |
| JP | 07-105686 A | 4/1995 |
| JP | 2010-015375 A | 1/2010 |

OTHER PUBLICATIONS http://www-users.cs.york.ac.uk/pcc/pc_history/CPU_cache.html, Published on Sep. 20, 2006.*

(Continued)

*Primary Examiner* — Ann J Lo
*Assistant Examiner* — Masud Khan
(74) *Attorney, Agent, or Firm* — Sughrue Mion, PLLC

(57) ABSTRACT

The memory power consumption is reduced more than in the past by performing a power control suitably for a nonvolatile memory. A memory control circuit is provided with a first register group for a CPU to perform separately initial setting of the operation mode (power OFF, standby, and power ON) of plural banks included in a nonvolatile memory, for every task of a program executed by the CPU, and an access determination unit which determines a bank to which an access from the CPU takes place, on the basis of the access address for instruction fetching and the kind of the fetched instruction. The memory control circuit switches the operation mode of each of the banks on the basis of the setting value of the first register group, and the determination result of the access determination unit.

12 Claims, 8 Drawing Sheets

(51) Int. Cl.
*G06F 12/06* (2006.01)
*G06F 13/16* (2006.01)

(52) U.S. Cl.
CPC .......... *G06F 1/3234* (2013.01); *G06F 3/0634* (2013.01); *G06F 12/0646* (2013.01); *G06F 13/1694* (2013.01); *G06F 2212/1028* (2013.01); *Y02D 10/13* (2018.01); *Y02D 10/14* (2018.01); *Y02D 50/20* (2018.01)

(56) References Cited

U.S. PATENT DOCUMENTS

| | | | | |
|---|---|---|---|---|
| 6,118,719 | A * | 9/2000 | Dell | G11C 11/406 365/222 |
| 6,633,987 | B2 * | 10/2003 | Jain | G06F 1/3203 713/300 |
| 8,161,272 | B2 | 4/2012 | Yamazoe | |
| 2003/0159004 | A1 * | 8/2003 | Tsern | G06F 1/3203 711/144 |
| 2005/0210206 | A1 * | 9/2005 | Woodbridge | G06F 12/0215 711/154 |
| 2007/0162682 | A1 * | 7/2007 | Abe | G06F 12/0646 711/5 |
| 2012/0179926 | A1 * | 7/2012 | Yamazoe | G06F 1/3203 713/320 |

OTHER PUBLICATIONS

Communication dated Sep. 30, 2017 from the State Intellectual Property Office of the P.R.C. in counterpart Chinese application No. 201410129073.0.

* cited by examiner

POWER CONTROL SETUP OF MEMORY BANK

| MEMORY BANK | KINDS OF ACCESS | MEMORY REGION ASSIGNMENT | INSTRUCTION ADDRESS DETERMINATION (ADEN) | INSTRUCTION DECODE DETERMINATION (DEEN) | BRANCH DETERMINATION (BREN) |
|---|---|---|---|---|---|
| BANK 0 | DATA (OPERANT) | S/OFF | 0 | 1 | 0 |
| BANK 1 | | S/OFF | 0 | 1 | 0 |
| BANK 2 | INSTRUCTION | S/OFF | 1 | 0 | 1 |
| BANK 3 | | S/OFF | 1 | 0 | 1 |
| BANK 4 | DATA/ INSTRUCTION | ON | 0 | 0 | 0 |

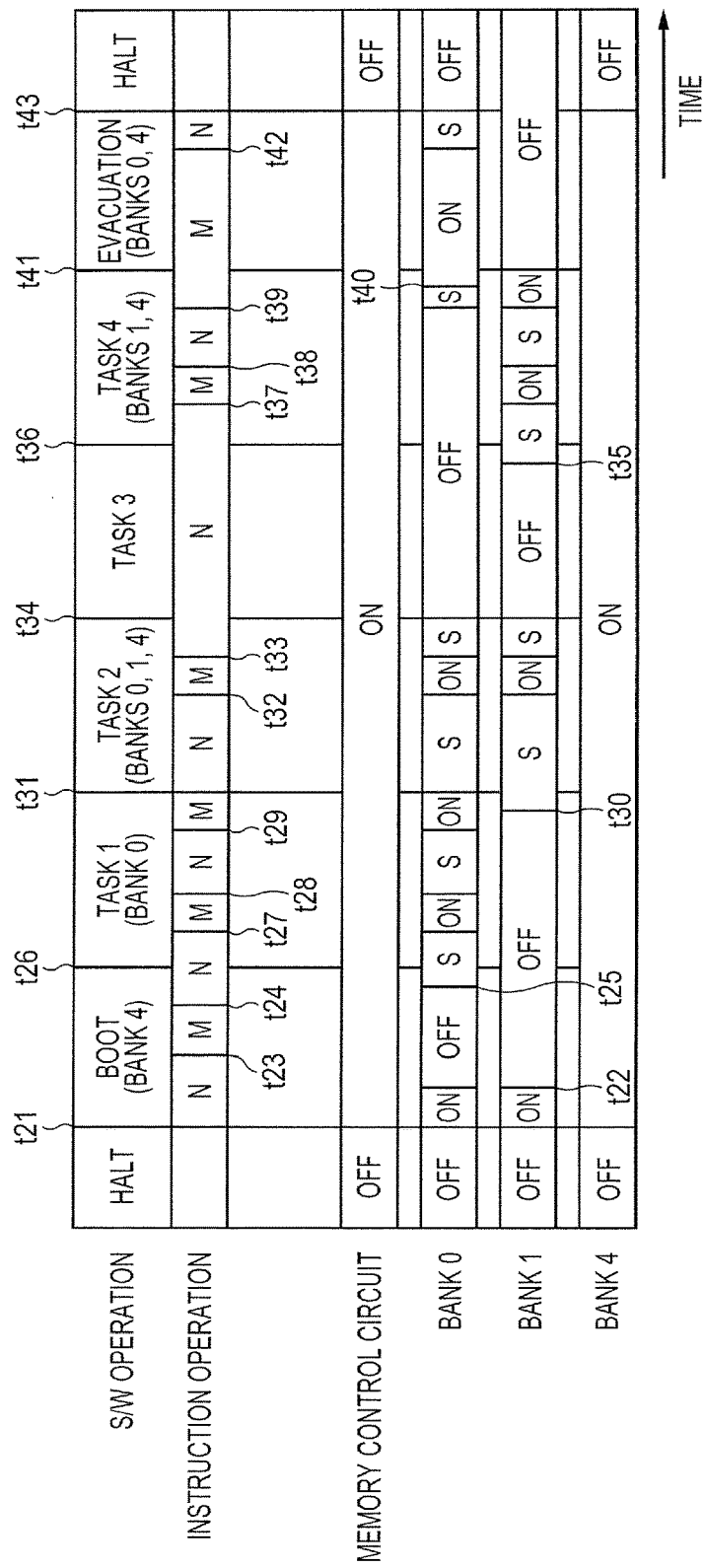

MEMORY CONTROL CIRCUIT

CROSS-REFERENCE TO RELATED APPLICATIONS

The disclosure of Japanese Patent Application No. 2013-076689 filed on Apr. 2, 2013 including the specification, drawings and abstract is incorporated herein by reference in its entirety.

BACKGROUND

The present invention relates to a memory control circuit, and is employed suitably for control of a nonvolatile memory configured with a plurality of banks, for example.

In a memory control circuit in related art which supplies a power to all memories, the problem is that the power consumption of the memory becomes large, since the power is equally supplied even to a memory which is not accessed. In order to cope with such a problem, a memory control circuit is developed in which a memory is divided into banks and the memory control circuit suppresses supply of the power to a memory bank which is not accessed.

For example, in a memory apparatus disclosed by Published Japanese Unexamined Patent Application No. Sho 63 (1988)-026892 (Patent Literature 1), a power supply current is supplied to a first and a second memory bank from a power supply current control circuit. The power supply current control circuit supplies a power supply current to both the first and the second memory bank, when a signal received from a control panel is a normal mode, and supplies a power supply current only to the first memory bank, when the signal received from the control panel is a low power mode.

In a memory controller disclosed by Published Japanese Unexamined Patent Application No. Hei 07 (1995)-105686 (Patent Literature 2), under the control of a power supply control circuit, a main power from a main power supply circuit is supplied only to a memory bank corresponding to a memory address actually accessed for an instruction fetch, and a memory address predicted to be accessed in the near future. A backup power from a backup power supply circuit is supplied to other memory banks which are not accessed. Here, the memory address predicted to be accessed in the near future is calculated by adding a prescribed address value increment to the current access address.

In a micro-processor disclosed by Published Japanese Unexamined Patent Application No. 2010-15375 (Patent Literature 3), a memory unit has a normal mode and a standby mode with less power consumption than the normal mode, as an operation mode. A memory control circuit detects a branch instruction among the instructions which a CPU has fetched from the memory unit, and changes the operation mode of the memory unit corresponding to the detection result.

PATENT LITERATURE (Patent Literature 1) Published Japanese Unexamined Patent Application No. Sho 63 (1988)-026892
(Patent Literature 2) Published Japanese Unexamined Patent Application No. Hei 07 (1995)-105686
(Patent Literature 3) Published Japanese Unexamined Patent Application No. 2010-15375

SUMMARY

By the way, when employing a nonvolatile memory, even if power supply is stopped to a memory bank to which no access is scheduled, the memory content thereof is not lost. Therefore, power consumption can be reduced by switching the power supply to each memory bank to one of three states of power OFF, supply of a standby voltage, and supply of a normal voltage (power ON). However, in the related art technology (for example, Patent Literatures 1-3), there is no disclosure about a concrete control means for switching the power supply among the three states corresponding to the operating condition of each memory bank.

Specifically, in the case of Published Japanese Unexamined Patent Application No. Sho 63 (1988)-026892 (Patent Literature 1), the power supply to a memory bank which is not used is shut down and no standby mode is provided. Therefore, the problem is that it is difficult to turn on the power of the memory bank promptly before access; accordingly the access takes time and the performance is deteriorated. Furthermore, in the case of Patent Literature 1, the power control of the memory bank is performed on the control panel. Therefore, it is difficult to switch the power control of the memory bank during program execution, and there is a problem that excessive electric power is consumed in a memory bank which is not accessed for a while.

On the other hand, in the case of Published Japanese Unexamined Patent Application No. Hei 07 (1995)-105686 (Patent Literature 2), a backup power is supplied to a memory bank which has not been accessed and the power is not controlled to OFF. In the case of Published Japanese Unexamined Patent Application No. 2010-15375 (Patent Literature 3), only a normal mode and a standby mode are similarly provided as the operation mode. Therefore, in the case of these Patent Literatures, the standby power (backup power) is supplied also to a memory bank which is not scheduled to be accessed. Therefore, there is a problem that excessive electric power is consumed.

As other problems in the related art technology, there is a problem that the method of predicting occurrence of future memory access is restricted. Specifically, in the case of Published Japanese Unexamined Patent Application No. Hei 07 (1995)-105686 (Patent Literature 2), the method is restricted to the method of predicting a future access address by adding a prescribed incremental value to the current access address. In the case of Published Japanese Unexamined Patent Application No. 2010-15375 (Patent Literature 3), the method is restricted to predicting the occurrence of future memory access by detecting a branch instruction. As a result, the related art technology has a problem that it is difficult to reduce the power supply of the memory bank in a period of no access, or that it is difficult to turn on the power of the memory bank promptly before access; accordingly the access takes time and the performance is deteriorated.

Therefore, the principal purpose of the present invention is to reduce the memory power consumption compared with the related art technology, by performing the appropriate power control for a nonvolatile memory by means of a memory control circuit for controlling the nonvolatile memory.

The other purpose of the present invention is to reduce the power consumption of a memory and to concurrently suppress degradation of the access performance of the memory, by predicting the occurrence of memory access more exactly than before to prevent a latency time in the memory access.

A memory control circuit according to one embodiment of the present invention is configured with a first register group for a CPU to perform separately initial setting of the operation mode (power OFF, standby, and power ON) of plural banks included in a nonvolatile memory, for every task of a program executed by the CPU, and an access determination unit which determines whether an access takes place from the CPU to each of the banks, on the basis of the access address for instruction fetching and the kind of the fetched instruction. The memory control circuit switches the operation mode of each of the banks on the basis of the setting value of the first register group and the determination result of the access determination unit.

According to the embodiment, it is possible to reduce the memory power consumption compared with the past, by performing the appropriate power control for the nonvolatile memory.

BRIEF DESCRIPTION OF THE DRAWINGS

FIG. 9 is a timing chart illustrating an operation example of the memory control circuit to data (operand) access.

DETAILED DESCRIPTION

Hereinafter, the embodiment is explained in detail with reference to drawings. The same reference symbol will be attached to the same or corresponding part, and the explanation thereof will not be repeated in some cases.

<An Entire Configuration of a Micro-processor>

Figure 1:
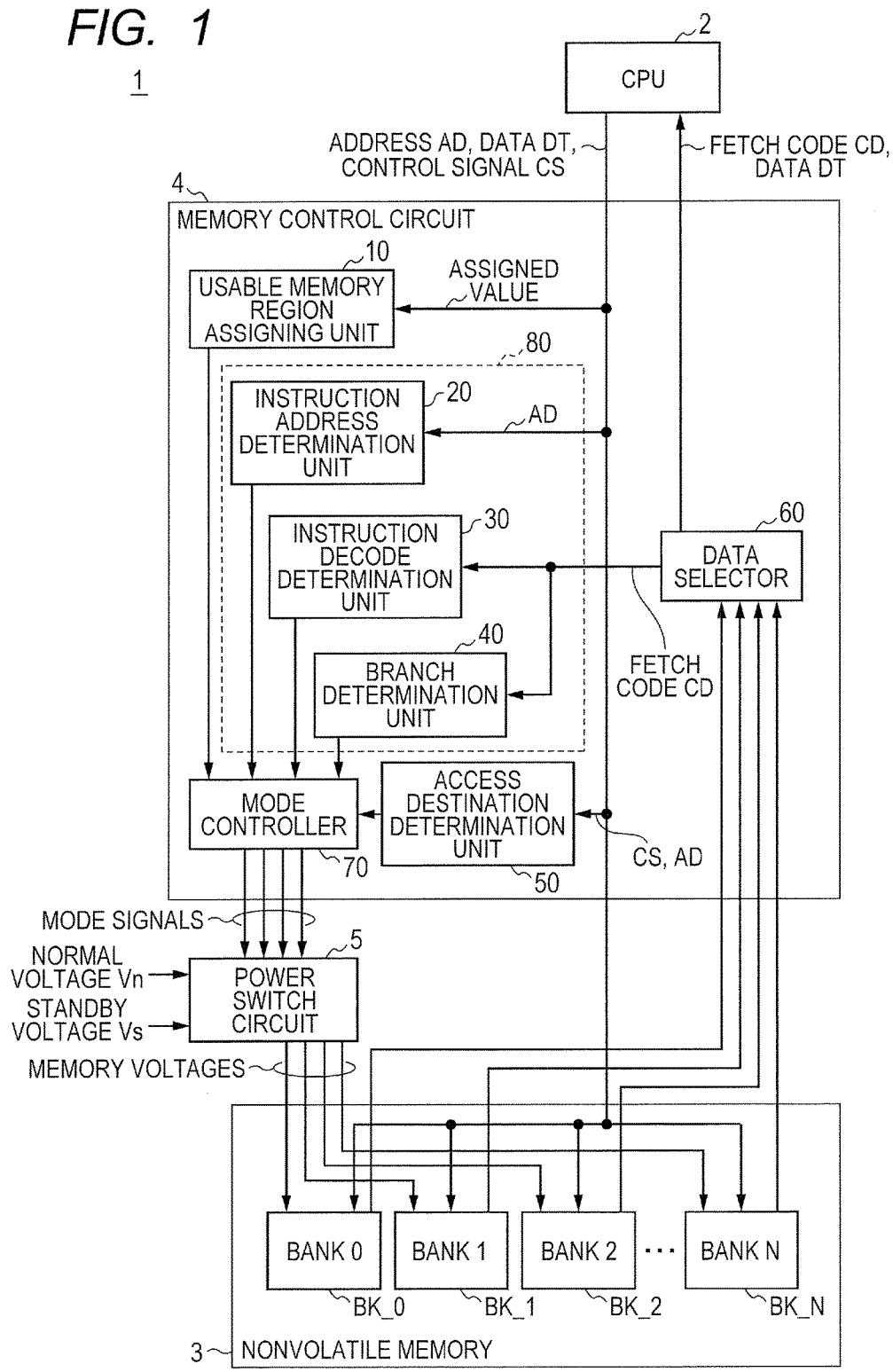
FIG. 1 is a block diagram illustrating a configuration of a micro-processor according to one embodiment.

FIG. 1 is a block diagram illustrating a configuration of a micro-processor according to one embodiment. As illustrated in FIG. 1, the micro-processor 1 includes a CPU (Central Processing Unit) 2, a nonvolatile memory 3, a memory control circuit 4, and a power switch circuit 5.

The CPU 2 fetches sequentially an instruction (fetch code CD) included in a program stored in the nonvolatile memory 3 (instruction fetch), and executes the fetched instruction. Usually, the CPU 2 outputs a memory address AD stored in a register called a program counter to the nonvolatile memory 3, and an instruction stored in the memory address AD concerned is read. According to an operand address and/or operand data described in the instruction, the CPU 2 writes data DT into the nonvolatile memory 3, or reads data DT from the nonvolatile memory 3. Furthermore, the CPU 2 outputs a control signal CS for memory access (read and write).

The nonvolatile memory 3 stores an instruction and data (operand data). The nonvolatile memory 3 can hold data stored, even after a power is off. Therefore, the nonvolatile memory 3 can reduce the power consumption than a volatile memory, by turning off power when no access is scheduled. The nonvolatile memory 3 may include an MRAM (Magnetoresistive Random Access Memory), a ReRAM (Resistance RAM), and an FeRAM (Ferroelectric RAM), for example.

As illustrated in FIG. 1, the nonvolatile memory 3 is divided into N memory banks BK_0-BK_N (when collectively called or when an unspecified one is referred to, they are described as a memory bank BK). Each memory bank BK has, as a power mode (also called an operation mode), a normal mode in which a normal voltage Vn is supplied, a standby mode in which a standby voltage Vs is supplied, and a power shutdown mode in which a power supply voltage is shut down. The normal voltage Vn is a voltage having a level which allows normal memory operation (read/write). The standby voltage Vs is a voltage lower than the normal voltage. Therefore, in the standby mode. the power consumption becomes smaller than in the normal mode. The standby voltage Vs is set up so that a rise time until the memory operation becomes possible may be within about tens of ns, when the standby mode is switched to the normal mode (that is, when the power supply voltage supplied to the memory bank BK changes from the standby voltage Vs to the normal voltage Vn). The concrete setting value of the standby voltage Vs is different depending on the property of the memory device.

A rise time until the memory operation becomes possible after the shutdown mode is switched to the normal mode (that is, after the power supply voltage supplied to the memory bank BK increases from 0 to the normal voltage Vn) takes several ps or more. This is because initialization for the memory to start is necessary. The rise time can be shortened, by supplying the standby voltage Vs and bringing the initialization to the state where the initialization is completed to some extent. In this way, by supplying the standby voltage instead of cutting off the power, the access to the memory becomes fast and deterioration of performance can be minimized.

In response to the memory access from the CPU 2, the memory control circuit 4 performs control of reading an instruction or data from the nonvolatile memory 3, and control of writing data to the nonvolatile memory 3. Furthermore, the memory control circuit 4 controls power supply for each memory bank BK (that is, switching control of the normal mode, the standby mode, and the power shutdown mode). The detailed configuration of the memory control circuit 4 is described later.

The power switch circuit 5 switches the power supply voltage to be supplied to each memory bank BK, to one of the normal voltage Vn, the standby voltage Vs, and the OFF state, depending on the mode signal for setting the power mode of each memory bank BK outputted from the memory control circuit 4.

<A Configuration of the Memory Control Circuit>

As illustrated in FIG. 1, the memory control circuit 4 includes internally a usable memory region assigning unit 10, an instruction address determination unit 20, an instruction decode determination unit 30, a branch determination unit 40, an access destination determination unit 50, a data selector 60, and a mode controller 70. A memory access determination unit 80 is configured with the instruction address determination unit 20, the instruction decode determination unit 30, and the branch determination unit 40. The memory access determination unit 80 determines whether an access takes place from the CPU 2 to each memory bank BK, on the basis of the access address at the time of the CPU 2 performing an instruction fetch, and the kind of the fetched instruction. Hereinafter, each component of the memory control circuit 4 is explained in order.

1. The Usable Memory Region Assigning Unit

The usable memory region assigning unit 10 is provided with control registers (11_0-11_N illustrated in FIG. 2) which can be set up for each memory bank BK, in order to assign the power supply voltage to be supplied to each memory bank BK (that is, a power-off, a standby voltage, and a normal voltage). The CPU 2 can set up the power supply voltage of a memory bank corresponding to each control register in advance by software processing.

For example, before memory access is actually performed for every program task, the CPU 2 assigns the mode of the memory bank BK, which is scheduled to be accessed by the program task concerned, as a standby mode or a power ON mode (normal voltage) and the mode of the memory bank BK, which is not scheduled to be accessed, as a power OFF mod, by the software processing. It is possible to reduce the time before the memory access, by setting the memory bank BK which is scheduled to be accessed as a standby mode or a power ON mode in advance. It is also possible to reduce the power consumption, by setting the memory bank BK which is not scheduled to be accessed as a power OFF mode.

As the software processing explained above, for example in a system implemented with an operating system (OS), a scheduler of the OS assigns a power OFF mode, a standby mode, or a power ON mode (normal voltage), when determining the order of a task. In a system not implemented with OS, a tool equivalent to the scheduler of the OS is executed by a compiler etc., and the tool has a buried program to assign a power OFF mode, a standby mode, or a power ON mode, when determining the order of a task 2. The Instruction Address Determination Unit The instruction address determination unit 20 is provided in order to turn on the power (to set as the normal voltage) to be supplied to a memory bank which includes an access address for the current instruction fetch, and in order to turn on the power (to set as the normal voltage) of a memory bank to which instruction access is performed subsequently, when the current access address approaches a bank boundary. Furthermore, after the instruction access destination has crossed the bank boundary, the instruction address determination unit 20 returns the power of a memory bank which has been accessed before crossing the bank boundary, to a standby mode. The instruction address determination unit 20 performs the above determining, on the basis of the detection result of the address indicated by a program counter in the CPU. A concrete configuration example of the instruction address determination unit 20 is described later with reference to FIG. 3.

3. The Instruction Decode Determination Unit

The instruction decode determination unit 30 decodes an instruction which the CPU 2 has read from a memory (fetch code), and determines whether an instruction for accessing a memory, such as an MOV (Move) instruction and a LOAD instruction, (hereinafter called a "memory access instruction") has been read from the memory. As a result, when a memory access instruction is detected by the instruction decode determination unit 30, the mode controller 70 turns on the power (sets as the normal voltage) of a memory bank BK as an accessing target, that is, basically a memory bank assigned to be in the standby state by the usable memory region assigning unit 10. When the decoded instruction is a succession of a NOP (No Operation) instruction or an instruction which does not access memories (called "non-memory-access instruction") such as an operation instruction, the mode controller 70 returns the power supply voltage supplied to a memory bank to the standby voltage. A concrete configuration example of the instruction decode determination unit 30 is described later with reference to FIG. 4.

The instruction decode determination unit 30 determines whether a fetch code is a memory access instruction, however, it does not determine a memory bank BK as a targeting access destination. The reason is as follows: it becomes necessary to provide a complicated decode circuit and an arithmetic circuit for determining the access destination, and as a result, not only increase in the production cost and development cost but unexpected increase in the power consumption cannot be avoided.

For example, when an access address is decoded from the fetched instruction to determine a memory bank as the access destination and when information on an absolute address is included as an operand of the fetched instruction, it is possible to determine the memory bank as the access destination with comparative ease. However, when information on a relative address is included in the fetched instruction, the processing which the CPU performs originally, such as addition of a current address and a relative address, becomes necessary. As a result, the packaging cost of a circuit becomes high and the power consumption does not decrease on the contrary.

In the case of the present embodiment, as will be explained with reference to FIG. 2, the usable memory region assigning unit 10 can assign the power OFF mode to the control register 11 corresponding to a memory bank BK to which neither instruction access nor data access is scheduled. Furthermore, as will be explained with reference to FIG. 4, the control registers 31_0-31_N provided in the instruction decode determination unit 30 can set up for a memory bank to which no data access is scheduled not to perform switching to a power ON mode (to determine that there is no data access at all times), on the basis of an instruction decode determination result. Accordingly, it is possible to reduce more the power consumption compared with the past.

4. The Branch Determination Unit

The branch determination unit 40 decodes an instruction (fetch code) which the CPU 2 has read from the memory, and determines whether the decoded instruction is a branch instruction. When the decoded instruction is a branch instruction as a result, the mode controller 70 turns on the power (sets as the normal voltage) of a memory bank BK as an accessing target, that is, basically a memory bank assigned to be in the standby state by the usable memory region assigning unit 10. After the branch instruction is determined by the branch determination unit 40, and after the time elapses until an instruction is executed, the mode controller 70 returns the power of the memory bank from the power ON to the standby voltage, on the basis of the determination result by the branch determination unit 40. After this, the power supply voltage supplied to the memory bank BK of the branch destination is controlled to be the normal voltage Vn, on the basis of the determination result by the instruction address determination unit 20. A concrete configuration example of the branch determination unit 40 is described later with reference to FIG. 5.

For the same reason as the case of the instruction decode determination unit 30, the branch determination unit 40 determines whether a fetch code is a branch instruction, however, it does not determine a memory bank as the branch destination.

In the case of the present embodiment, as will be explained with reference to FIG. 2, the usable memory region assigning unit 10 can assign the power OFF mode to the control register 11 corresponding to a memory bank BK to which neither instruction access nor data access is scheduled. Furthermore, as will be explained with reference to FIG. 5, the control registers 41_0-41_N provided in the branch determination unit 40 can set up to a memory bank to which no instruction access is scheduled, not to perform switching to a power ON mode (to determine that there is no instruction access at all times), on the basis of a branch determination result. Accordingly, it is possible to reduce more the power consumption compared with the past.

5. The Access Destination Determination Unit

The access destination determination unit 50 detects a request signal outputted from the CPU 2 to the nonvolatile memory 3, and an access address AD outputted from the CPU 2 to the nonvolatile memory 3 for an instruction access and a data access. The request signal is asserted during the access to the nonvolatile memory 3 from the CPU 2 (when either an instruction access or a data access takes place). The access destination determination unit 50 determines that, when the request signal is asserted, an access by the CPU 2 takes place to a memory bank BK corresponding to the current access address. When the request signal is negated, the access destination determination unit 50 determines that there is no access by the CPU 2 to any memory bank BK.

In the memory control circuit 4 illustrated in FIG. 1, when the data stored in the memory is accessed by the CPU 2, the configuration is devised such that the instruction decode determination unit 30 predicts that a data access takes place. However, when the prediction by the instruction decode determination unit 30 goes wrong, if the power of the memory bank BK as the accessing target is not set to "ON", a hang-up occurs. In order to prevent the hang-up, the access destination determination unit 50 is provided.

Figure 3:
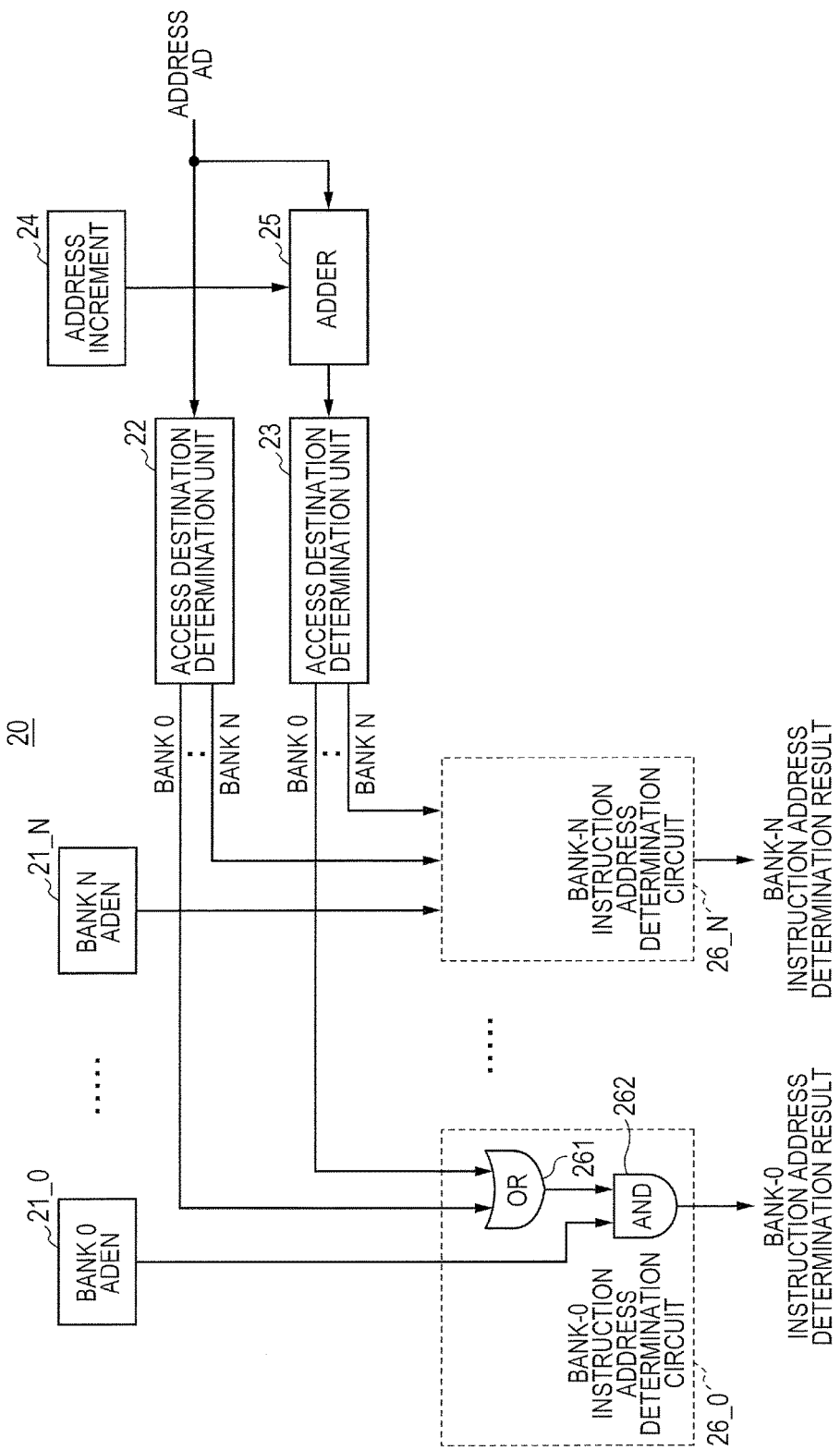
FIG. 3 is a drawing illustrating an example of the internal configuration of an instruction address determination unit illustrated in FIG. 1.

When the instruction stored in a memory is accessed by the CPU 2 on the other hand, basically, the instruction address determination unit 20 turns on the power of the memory bank which is currently accessed and the memory bank which is scheduled to be accessed. Therefore, the access destination determination unit 50 is not necessary. However, when the setting value (the value of an address determination enable signal ADEN) of the control registers 21_0-21_N illustrated in FIG. 3 is set up erroneously for example, it is possible to prevent a hang-up with the use of the access destination determination unit 50.

6. The Data Selector

The data selector 60 reads the instruction and data of a memory bank defined as a read target by the CPU 2. The data selector 60 outputs the instruction (fetch code CD) and data DT which have been read, to the CPU 2, and at the same time, outputs the fetch code CD also to the instruction decode determination unit 30 and the branch determination unit 40.

7. The Mode Controller

The mode controller 70 receives a control signal indicating the power supply assignment (power ON/standby/power OFF) to each memory bank BK from the usable memory region assigning unit 10. It also receives a control signal for instructing the power ON of each memory bank BK from the instruction address determination unit 20, the instruction decode determination unit 30, and the branch determination unit 40. Furthermore, the mode controller 70 receives, from the access destination determination unit 50, a control signal indicating whether each memory bank BK is accessed by the CPU 2. On the basis of these control signals, the mode controller 70 outputs to the power switch circuit 5 a mode signal indicating one of the power ON, the standby, and the power OFF for every memory bank BK. Hereinafter, with reference to FIG. 2, the configuration example of the mode controller 70 is explained in detail.

<A Configuration Example of the Usable Memory Region Assigning Unit and the Mode Controller>

Figure 2:
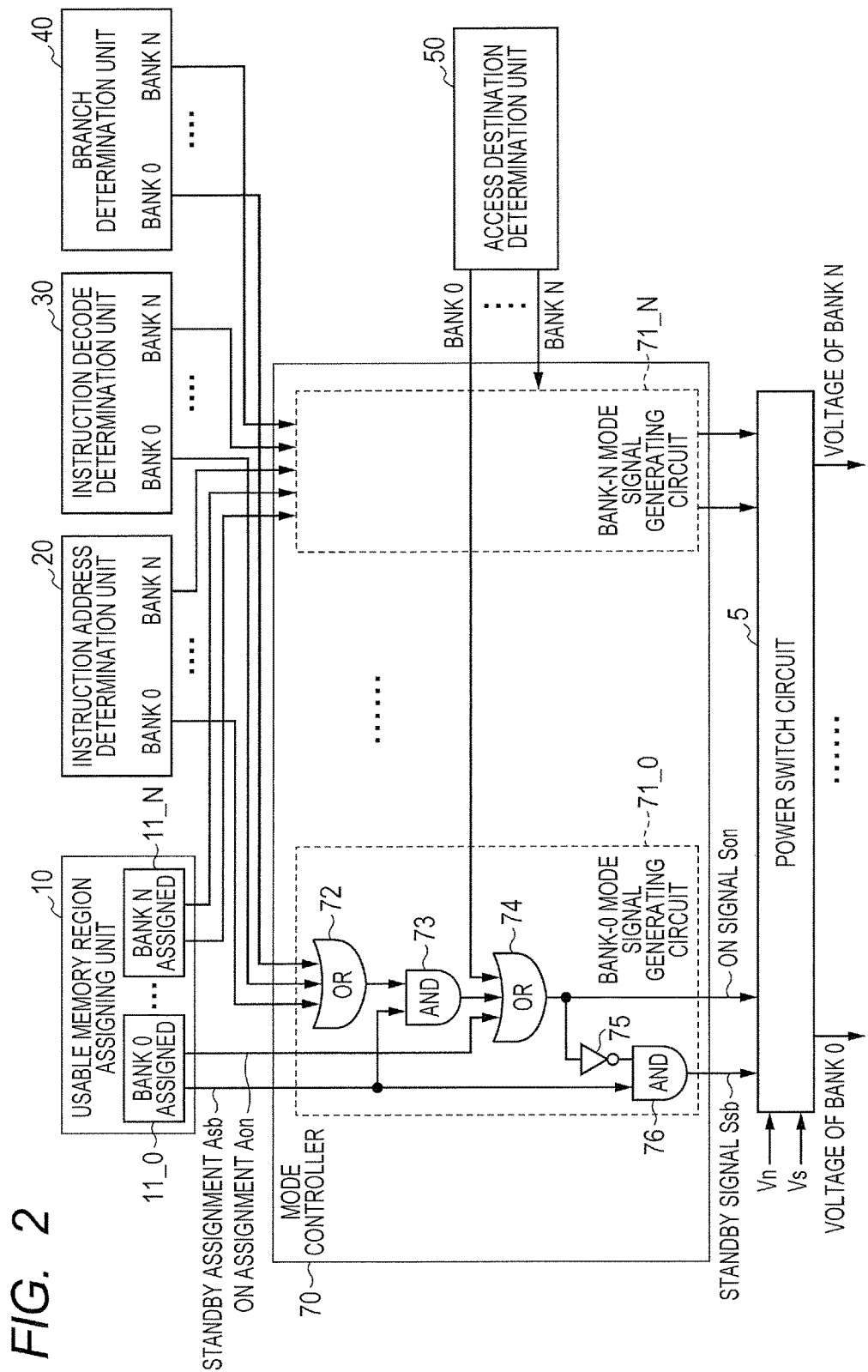
FIG. 2 is a drawing illustrating an example of the internal configuration of a usable memory region assigning unit and a mode controller illustrated in FIG. 1.

FIG. 2 illustrates an example of the internal configuration of the usable memory region assigning unit and the mode controller illustrated in FIG. 1.

As illustrated in FIG. 2, the usable memory region assigning unit 10 includes control registers 11_0-11_N (when collectively called or when an unspecified one is referred to, they are described as a control register 11), provided respectively corresponding to the memory banks BK_0-BK_N illustrated in FIG. 1.

Each control register 11 stores 2-bit control data (a standby assignment value Asb and an ON assignment value Aon). In each control register 11, when assigning the power ON to the corresponding memory bank BK, the ON assignment value Aon is set as "1." (In the present case, the standby assignment value Asb may be either of "1" and "0", however, it is usually set to "0"). When assigning the standby mode to the corresponding memory bank BK, the ON assignment value Aon is set as "0", and the standby assignment value Asb is set as "1." When assigning the power OFF mode to the corresponding memory bank BK, the ON assignment value Aon is set as "0", and the standby assignment value Asb is set as "0."

The mode controller 70 includes mode signal generating circuits 71_0-71_N (when collectively called or when an unspecified one is referred to, they are described as a mode signal generating circuit 71), provided respectively corresponding to the memory banks BK_0-BK_N illustrated in FIG. 1. Each mode signal generating circuit 71 receives the standby assignment value Asb and the ON assignment value Aon inputted from the corresponding control register 11 of the usable memory region assigning unit 10.

Furthermore, each mode signal generating circuit 71 receives a control signal indicating the determination result from each of the instruction address determination unit 20, the instruction decode determination unit 30, and the branch determination unit 40. As explained with reference to FIG. 1, the instruction address determination unit 20 determines a memory bank BK currently accessed and a memory bank BK to be accessed next, by the CPU 2 for an instruction access, and sets "1" to a control signal to be outputted to the mode signal generating circuit 71 corresponding to the memory bank BK, and sets "0" to a control signal to be outputted to the other mode signal generating circuits 71. The instruction decode determination unit 30 sets "1" to a control signal to be outputted to each mode signal generating circuit 71, when the fetch code is a memory access instruction. The branch determination unit 40 sets "1" to a control signal to be outputted to each mode signal generating circuit 71, when the fetch code is a branch instruction.

Furthermore, each mode signal generating circuit 71 receives a control signal from the access destination determination unit 50. As explained with reference to FIG. 1, when the CPU 2 is accessing the nonvolatile memory 3 for an instruction access and a data access (when the request signal is asserted), the access destination determination unit 50 outputs a control signal "1" to the mode signal generating circuit 71 corresponding to the memory bank BK as the access destination, and a control signal "0" to the other mode signal generating circuits 71.

Next, the concrete configuration example of each mode signal generating circuit 71 is explained. As illustrated in FIG. 2, each mode signal generating circuit 71 includes OR gates 72 and 74, AND gates 73 and 76, and an inverter 75.

The OR gate 72 receives control signals correspondingly outputted from each of the instruction address determination unit 20, the instruction decode determination unit 30, and the branch determination unit 40. The OR gate 72 performs the OR operation of these control signals, and outputs an arithmetic result to the AND gate 73.

The AND gate 73 performs the AND operation of the output of the OR gate 72 and the standby assignment value Asb stored in the corresponding control register 11 of the usable memory region assigning unit 10, and outputs an arithmetic result to the OR gate 74.

The OR gate 74 performs the OR operation of the output of the AND gate 73, the control signal correspondingly outputted from the access destination determination unit 50, and the ON assignment value Aon stored in the corresponding control register 11 of the usable memory region assigning unit 10, and outputs an arithmetic result to the power switch circuit 5 as the ON signal Son.

The AND gate 76 performs the AND operation of the standby assignment value Asb and a signal obtained by inverting the logical value of the output of the OR gate 74 by the inverter 75, and outputs an arithmetic result to the power switch circuit 5 as the standby signal Ssb.

In response to the ON signal Son and the standby signal Ssb received from each mode signal generating circuit 71, the power switch circuit 5 switches the power supply voltage to be supplied to the memory bank BK respectively corresponding to each mode signal generating circuit 71, to one of the normal voltage Vn, the standby voltage Vs, and the OFF state. Specifically, when the ON signal Son received from a certain mode signal generating circuit 71 is "1", the power switch circuit 5 outputs the normal voltage Vn to the corresponding memory bank BK. When the ON signal Son received from a certain mode signal generating circuit 71 is "0" and when the standby signal Ssb is "1", the power switch circuit 5 outputs the standby voltage Vs to the corresponding memory bank BK. When the ON signal Son received from a certain mode signal generating circuit 71 is "0" and when the standby signal Ssb is "0", the power switch circuit 5 shuts down the power supply to the corresponding memory bank BK.

According to the above described configuration of the mode controller 70 and the power switch circuit 5, the value of the ON signal Son and the value of the standby signal Ssb which are outputted from each mode signal generating circuit 71 to the power switch circuit 5 are as follows.

(i) The case where the ON assignment value Aon stored in the corresponding control register 11 of the usable memory region assigning unit 10 is "1" (the case where the initial setting is the normal mode) is explained. In the present case, the ON signal Son is set to "1" and the standby signal Ssb is set to "0", irrespective of the determination result of each of the determination units 20, 30, 40, and 50. As a result, the normal voltage Vn is supplied to the corresponding memory bank BK from the power switch circuit 5.

(ii) The case where the ON assignment value Aon stored in the corresponding control register 11 of the usable memory region assigning unit 10 is "0" and the standby assignment value Asb is "0" (the case where the initial setting is the power shutdown mode) is explained. In the present case, when the control signal correspondingly outputted from the access destination determination unit 50 is "0", the ON signal Son to be outputted to the power switch circuit 5 is set to "0", and the standby signal Ssb is set to "0."

As a result, the power supply from the power switch circuit 5 to the corresponding memory bank BK is shut down. Even if the control signal correspondingly outputted from at least one of the instruction address determination unit 20, the instruction decode determination unit 30, and the branch determination units 40. is "1", the operation mode of the corresponding memory bank BK is maintained as the power shutdown mode.

On the other hand, when the corresponding control signal outputted from the access destination determination unit 50 is "1", the ON signal Son is set to "1" and the standby signal Ssb is set to "0." As a result, the normal voltage Vn is supplied to the corresponding memory bank BK from the power switch circuit 5. That is, when the corresponding control signal outputted from the access destination determination unit 50 is "1", the operation mode of the corresponding memory bank BK is switched to the normal mode, irrespective of the setting value of the corresponding control register 11 of the usable memory region assigning unit 10 and the determination result of each of the determination units 20, 30 and 40.

(iii) The case where the ON assignment value Aon stored in the Corresponding control register 11 of the usable memory region assigning unit 10 is "0" and the standby assignment value Asb is "1" (the case where the initial setting is the standby mode) is explained. In the present case, when the control signal correspondingly outputted from at least one of the instruction address determination unit 20, the instruction decode determination unit 30, the branch determination unit 40, and the access destination determination units 50 is "1", the ON signal Son is set to "1" and the standby signal Ssb is set to "0." As a result, the normal voltage Vn is supplied from the power switch circuit 5 to the corresponding memory bank BK (the operation mode is switched to the normal mode). On the other hand, when all the control signals are "0", the ON signal Son is set to "0" and the standby signal Ssb is set to "1." As a result, the standby voltage Vs is supplied from the power switch circuit 5 to the corresponding memory bank BK.

<A Configuration Example of the Instruction Address Determination Unit>

FIG. 3 illustrates an example of the internal configuration of the instruction address determination unit illustrated in FIG. 1. As illustrated in FIG. 3, the instruction address determination unit 20 includes control registers 21_0-21_N and 24, an adder 25, access destination determination units 22 and 23, and instruction address determination circuits 26_0-26_N.

The control registers 21_0-21_N (when collectively called or when an unspecified one is referred to, they are described as a control register 21) are provided respectively corresponding to the memory banks BK_0-BK_N illustrated in FIG. 1. Each control register 21 holds a control value (an address determination enable signal ADEN) for setting whether to enable or to disenable the control by the instruction address determination unit 20 to the corresponding memory bank BK. The value of each control register 21 is set up by the CPU 2 illustrated in FIG. 1.

The control register 24 holds an address increment which is added to the current access address. The address increment is used in order to determine whether the current access address comes close to a boundary with a memory bank to be accessed next. The value of the control register 24 is set up by the CPU 2 illustrated in FIG. 1. The adder 25 adds the address increment to the current access address.

The access destination determination unit 22 determines a memory bank of the access destination, on the basis of the inputted current access address, and sets "1" to the control signal corresponding to the memory bank BK which is currently accessed, and sets "0" to the control signal corresponding to the other memory banks. The control signals for the memory banks BK_0-BK_N outputted from the access destination determination unit 22 are supplied to the instruction address determination circuits 26_0-26_N, respectively.

The access destination determination unit 23 determines the memory bank corresponding to an address value of the addition result of the adder 25, and sets "1" to the control signal corresponding to the determined memory bank BK, and sets "0" to the control signal corresponding to the other memory banks BK. The control signals for the memory banks BK_0-BK_N outputted from the access destination determination unit 23 are supplied to the instruction address determination circuits 26_0-26_N, respectively.

The instruction address determination circuits 26_0-26_N (when collectively called or when an unspecified one is referred to, they are described as an instruction address determination circuit 26) are provided respectively corresponding to the memory banks BK_0-BK_N illustrated in FIG. 1. Each instruction address determination circuit 26 includes an OR gate 261 and an AND gate 262.

The OR gate 261 receives control signals correspondingly outputted from each of the access determination units 22 and 23, and performs the OR operation of these control signals. The AND gate 262 performs the AND operation of the arithmetic result of the OR gate 261 and the control value ADEN from the corresponding control register 21. The arithmetic result of the AND gate 262 is inputted into the corresponding mode signal generating circuit 71 in the mode controller 70 illustrated in FIG. 2 as a control signal indicating the address determination result.

According to the above-described configuration, each instruction address determination circuit 26 operates as follows.

(i) In the case where the value of the corresponding control register 21 is "0", the output of the instruction address determination circuit 26 (the output of the AND gate 262) is set to "0." In this case, control on the basis of the determination result of the instruction address determination circuit 26 is not performed to the corresponding memory bank BK.

(ii) In the case where the value of the corresponding control register 21 is "1" and when at least one of the control signals correspondingly outputted from the access destination determination units 22 and 23 is "1", the output of the instruction address determination circuit 26 (the output of AND gate 262) is set to "1." As a result, as explained with reference to FIG. 2, basically, unless the power OFF mode is assigned by the usable memory region assigning unit 10, the power supply voltage supplied to the corresponding memory bank BK is set as the normal voltage Vn (power ON mode). The case described above corresponds to the case where the corresponding memory bank BK is currently instruction-accessed by the CPU 2 or to be instruction-accessed next since the address of the corresponding memory bank BK is close to the current access address.

(iii) In the case where the value of the corresponding control register 21 is "1" and both of the corresponding control signals outputted respectively from the access destination determination units 22 and 23 are "0", the output of the instruction address determination circuit 26 (the output of the AND gate 262) is set to "0." The present case corresponds to the case where the corresponding memory bank BK is neither the current instruction access target nor the next instruction access target. The power supply voltage supplied to the corresponding memory bank BK is not switched to the normal voltage Vn, and the power OFF or the standby voltage Vs is maintained.

<A Configuration Example of the Instruction Decode Determination Unit>

Figure 4:
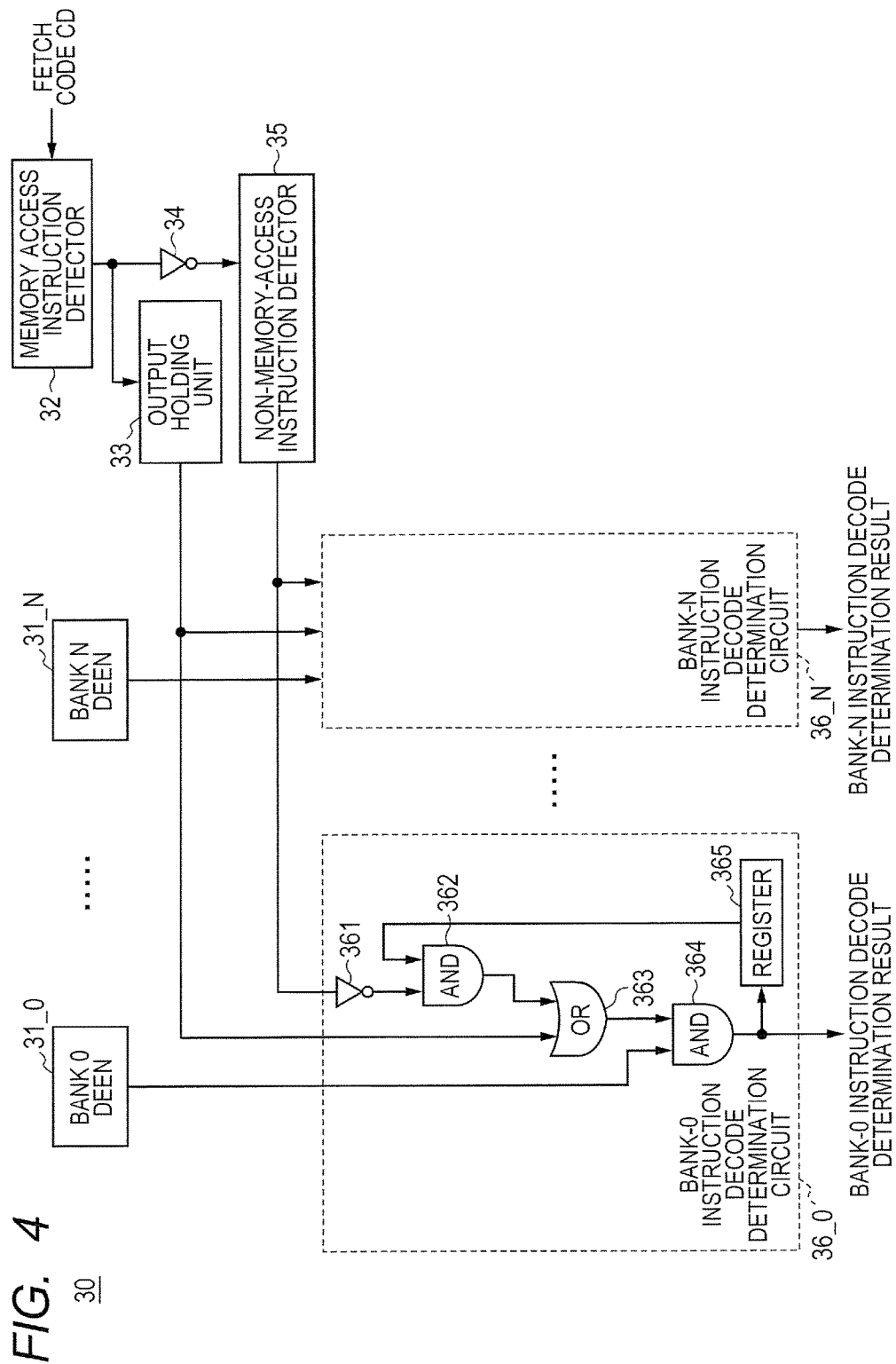
FIG. 4 is a drawing illustrating an example of the internal configuration of an instruction decode determination unit illustrated in FIG. 1.

FIG. 4 illustrates an example of the internal configuration of the instruction decode determination unit illustrated in FIG. 1. As illustrated in FIG. 4, the instruction decode determination unit 30 includes control registers 31_0-31_N, a memory access instruction detector 32, an output holding unit 33, an inverter 34, a non-memory-access instruction detector 35, and instruction decode determination circuits 36_0-36_N.

The control registers 31_0-31_N (when collectively called or when an unspecified one is referred to, they are described as a control register 31) are provided respectively corresponding to the memory banks BK_0-BK_N illustrated in FIG. 1. Each control register 31 holds a control value (a decode determination enable signal DEEN) for setting whether to enable or to disenable the control by the instruction decode determination unit 30 to the corresponding memory bank BK. The value of each control register 31 is set up by the CPU 2 illustrated in FIG. 1.

The memory access instruction detector 32 decodes the inputted fetch code CD, and detects an instruction to access a memory (memory access instruction), such as an MOV (Move) instruction and a LOAD instruction. The memory access instruction detector 32 outputs "1" when the fetch code is a memory access instruction, and outputs "0" when the fetch code is not a memory access. instruction (that is, when it is a non-memory-access instruction).

After detecting the memory access instruction, the output holding unit 33 holds the value of the detection result ("1" or "0") until the instruction is executed.

When the fetch code CD decoded by the memory access instruction detector 32 is an instruction not to access memories (non-memory-access instruction), such as an NOP instruction and an operation instruction, the non-memory-access instruction detector 35 detects whether the non-memory-access instruction has been detected a specified number of times and consecutively. Specifically, the non-memory-access instruction detector 35 receives a signal obtained by inverting the logical value of the output of the memory access instruction detector 32. Assuming that the specified number of times is 3, for example, the non-memory-access instruction detector 35 outputs "1" when the state where the detection result of the memory access instruction detector 32 is "0" (that is, the output of the inverter 34 is "1") continues 3 times or more, otherwise, outputs "0."

The instruction decode determination circuits 36_0-36_N (when collectively called or when an unspecified one is referred to, they are described as an instruction decode determination circuit 36) are provided respectively corresponding to the memory banks BK_0-BK_N illustrated in FIG. 1. Each instruction decode determination circuit 36 includes an inverter 361, AND gates 362 and 364, an OR gate 363, and a register 365.

The AND gate 362 performs the AND operation of a signal obtained by inverting the logical value of the output of the non-memory-access instruction detector 35 with the inverter 361, and the value currently held in the register 365. The OR gate 363 performs the OR operation of the output of the output holding unit 33 and the arithmetic result of the AND gate 362. The AND gate 364 performs the AND operation of the arithmetic result of the OR gate 363 and the control value DEEN from the corresponding control register 31. The arithmetic result of the AND gate 364 is inputted into the corresponding mode signal generating circuit 71 in the mode controller 70 illustrated in FIG. 2 as a control signal indicating the instruction decode determination result. The arithmetic result of the AND gate 364 is held further in the register 365.

The reason for providing the register 365 is that, when the instruction decode determination result becomes "1", the output of the determination result is maintained at the value "1" until the non-memory-access instruction detector 35 outputs "1." If the output value of the instruction decode determination result ("1" or "0") is switched frequently, the power supply voltage supplied to each memory bank BK will also change frequently. As a result, undesirable extra electric power will be consumed. Therefore, only when the non-memory-access instruction detector 35 determines that the memory access instruction does not continue more than the specified number of times, the instruction decode determination result is set to "0."

According to the above-described configuration, each instruction decode determination circuit 36 operates as follows.

(i) In the case where the value of the corresponding control register 31 is "0", the output of the instruction decode determination circuit 36 (the output of the AND gate 364) is set to "0." In this case, control on the basis of the determination result of the instruction decode determination circuit 36 is not performed to the corresponding memory bank BK.

(ii) In the case where the value of the corresponding control register 31 is "1" and the output of the output holding unit 33 is "1" (that is, the fetch code is a memory access instruction), the output of the instruction decode determination circuit 36 (the output of the AND gate 364) is set to "1." As a result, as explained with reference to FIG. 2, basically, unless the power OFF mode is assigned by the usable memory region assigning unit 10, the power supply voltage supplied to the corresponding memory bank BK is set as the normal voltage Vn (power ON mode).

(iii) In the case where the value of the corresponding control register 31 is "1" and the output of the output holding unit 33 is "0" and the output of the non-memory-access instruction detector 35 is "1" (when the non-memory-access instruction continues more than the specified number of times), the output of the instruction decode determination circuit 36 (the output of the AND gate 364) is set to "0." The power supply voltage supplied to the corresponding memory bank BK is not switched to the normal voltage Vn, and the power OFF or the standby voltage Vs is maintained.

<A Configuration Example of the Branch Determination Unit>

Figures 5, 6:
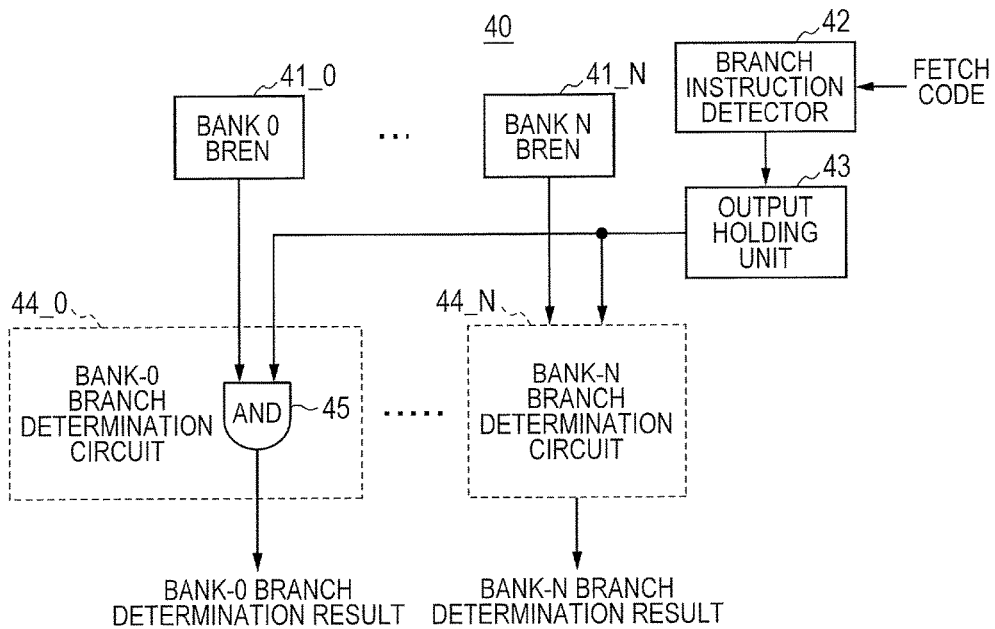
FIG. 5 is a drawing illustrating an example of the internal configuration of a branch determination unit illustrated in FIG. 1.
FIG. 6 is a table illustrating an example of power control setup of each memory bank.

FIG. 5 illustrates an example of the internal configuration of the branch determination unit illustrated in FIG. 1. As illustrated in FIG. 5, the branch determination unit 40 includes control registers 41_0-41_N, a branch instruction detector 42, an output holding unit 43, and branch determination circuits 44_0-44_N.

The control registers 41_0-41_N (when collectively called or when an unspecified one is referred to, they are described as a control register 41) are provided respectively corresponding to the memory banks BK_0-BK_N illustrated in FIG. 1. Each control register 41 holds a control value (a branch determination enable signal BREN) for setting whether to enable or to disenable the control by the branch determination unit 40 to the corresponding memory bank BK. The value of each control register 41 is set up by the CPU 2 illustrated in FIG. 1.

The branch instruction detector 42 decodes the inputted fetch code CD to detect a branch instruction. The branch instruction detector 42 outputs "1" when the fetch code is a branch instruction, and outputs "0" when the fetch code is not a branch instruction.

After detecting the branch instruction, the output holding unit 43 holds the value of the detection result ("1" or "0") until the instruction is executed.

The branch determination circuits 44_0-44_N (when collectively called or when an unspecified one is referred to, they are described as a branch determination circuit 44) are provided respectively corresponding to the memory bank BK_0-BK_N illustrated in FIG. 1

Each branch determination circuit 44 includes an AND gate 45. The AND gate 45 performs the AND operation of the output of the output holding unit 33 and the control value BREN from the corresponding control register 41. The arithmetic result of the AND gate 45 is inputted into the corresponding mode signal generating circuit 71 in the mode controller 70 illustrated in FIG. 2, as a control signal indicating the branch determination result.

According to the above-described configuration, each branch determination circuit 44 operates as follows.

(i) In the case where the value of the corresponding control register 41 is "0", the output of the branch determination circuit 44 (the output of the AND gate 45) is set to "0." In this case, control on the basis of the determination result of the branch determination circuit 44 is not performed to the corresponding memory bank BK.

(ii) In the case where the value of the corresponding control register 41 is "1" and the output of the output holding unit 43 is "1" (that is, the fetch code is a branch instruction), the output of the branch determination circuit 44 (the output of the AND gate 45) is set to "1." As a result, as explained with reference to FIG. 2, basically, unless the power OFF mode is assigned by the usable memory region assigning unit 10, the power supply voltage supplied to the corresponding memory bank BK is set as the normal voltage Vn (power ON mode).

(iii) In the case where the value of the corresponding control register 41 is "1" and the output of the output holding unit 43 is "0", the output of the branch determination circuit 44 (the output of the AND gate 45) is set to "0." The power supply voltage supplied to the corresponding memory bank BK is not switched to the normal voltage Vn, and the power OFF or the standby voltage Vs is maintained.

<An Operation Example of the Memory Control Circuit>

Next, an operation example of the memory control circuit is explained. In the present operation example, it is assumed that five pieces (N=4) of memory banks BK_0-BK_4 are provided in total. Hereinafter, the memory banks BK_0-BK_4 will be briefly described respectively as banks 0-4 or memory banks 0-4 in some cases. The banks 0 and 1 store data (operand), the banks 2 and 3 store an instruction, and the bank 4 stores both of data and an instruction.

FIG. 6 is a table illustrating an example of power control setup of each memory bank. As illustrated in FIG. 6, the control registers 11_0-11_3 of the usable memory region assigning unit 10 explained with reference to FIG. 2 are set as the standby (Asb=1 and Aon=0) or the power OFF (Asb=0 and Aon=0), depending on the operating condition of the respectively corresponding memory banks 0-3. The bank 4 is always accessed, accordingly, the corresponding control register 11_4 of the usable memory region assigning unit 10 is set as the power ON (Aon=1). In FIG. 6, the standby is expressed as "S", the power OFF is expressed as "OFF", and the power ON is expressed as "ON."

As to the setup of each control register 21 of the instruction address determination unit 20 explained with reference to FIG. 3, a data access is performed and an instruction access is not performed in the banks 0 and 1. Therefore, the corresponding control registers 21_0 and 21_1 are set as "0." The instruction access is performed in the banks 2 and 3, accordingly, the corresponding control registers 21_2 and 21_3 are set as "1." The bank 4 is set as the power ON by the control register 11_4 of the usable memory region assigning unit 10; accordingly, it is not necessary to perform the instruction address determination. Therefore, the corresponding control register 21_4 is set as "0."

As to the setup of each control register 31 of the instruction decode determination unit 30 explained with reference to FIG. 4, a data access is performed in the banks 0 and 1. Therefore, the corresponding control registers 31_0 and 31_1 are set as "1." In the banks 2 and 3, an instruction access is performed and no data access is performed. Therefore, the corresponding control registers 31_2 and 31_3 are set as "0." The bank 4 is set as the power ON by the control register 11_4 of the usable memory region assigning unit 10; accordingly, it is not necessary to perform the instruction decode determination. Therefore, the corresponding control register 21_4 is set as "0."

As to the setup of each control register 41 of the branch determination unit 40 explained with reference to FIG. 5, the data access is performed and the instruction access is not performed in the banks 0 and 1. Therefore, the corresponding control registers 41_0 and 41_1 are set as "0." The instruction access is performed in the banks 2 and 3, accordingly, the corresponding control registers 41_2 and 41_3 are set as "1." The bank 4 is set as the power ON by the control register 11_4 of the usable memory region assigning unit 10; accordingly, it is not necessary to perform the branch determination. Therefore, the corresponding control register 41_4 is set as "0".

1. An Example of the Operation to Instruction Access

Figure 7:
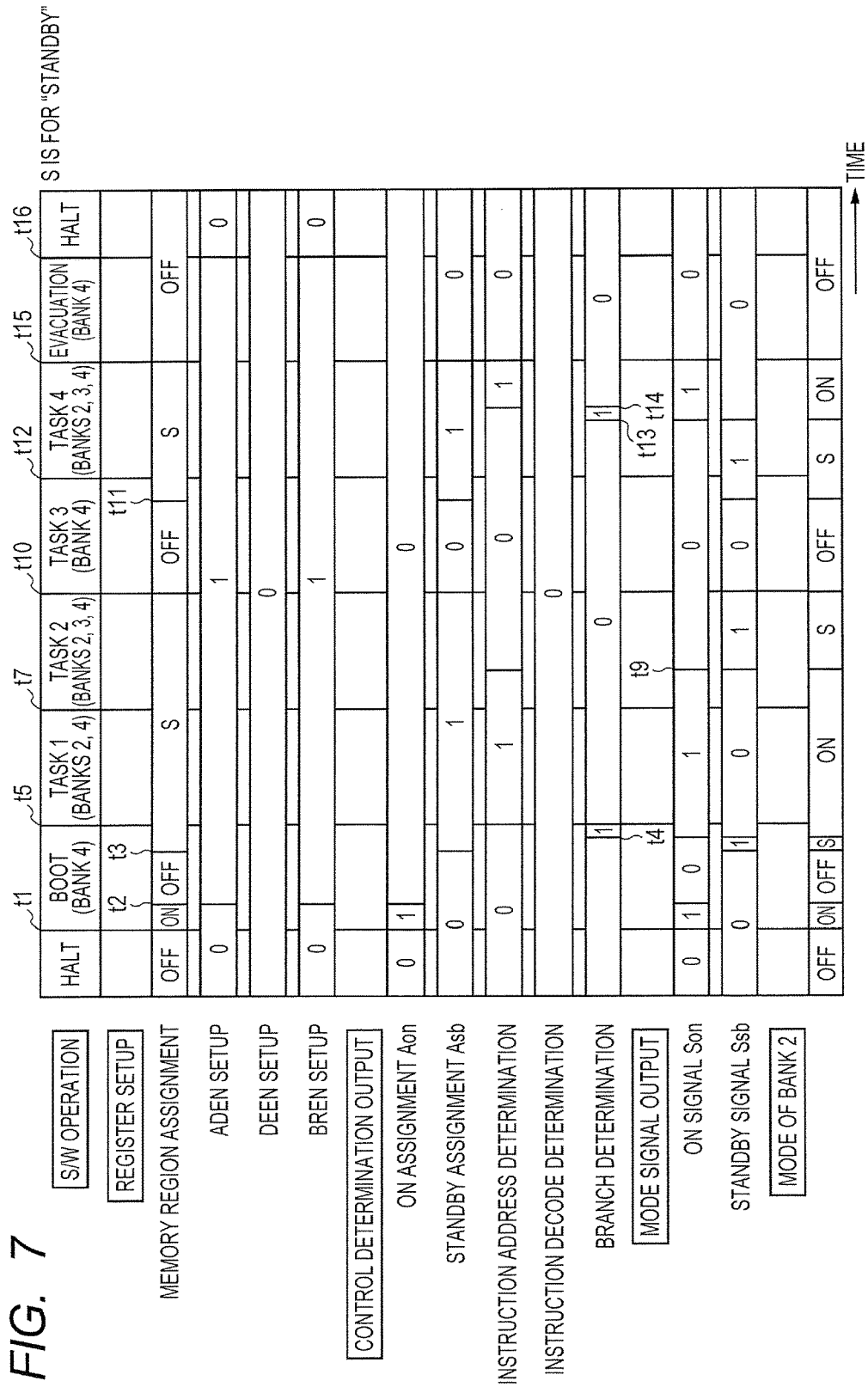
FIG. 7 is a timing chart illustrating an example of power control to a memory bank 2.

FIG. 7 is a timing chart illustrating an example of power control to the memory bank 2. FIG. 7 illustrates, beginning at the top, an operation of the software at the time of executing a program (S/W operation); values which have been set by the CPU to the control registers for the bank 2 in order to perform the power control; the outputs of the usable memory region assigning unit 10 and each of the determination units 20, 30, and 40; values of the mode signals (ON signal and standby signal) for the bank 2 outputted from the mode controller 70; and the power mode of the bank 2.

As illustrated in FIG. 1 and FIG. 7, in the S/W operation, it is possible for the usable memory region assigning unit 10 to assign which memory bank to be used for each of the program tasks including a boot task, tasks 1-4, and an evacuation task. In the case of FIG. 7, for an instruction access, the bank 4 is used in the boot and the evacuation, the banks 2 and 4 are used in the task 1, the banks 2, 3, and 4 are used in the tasks 2 and 4, and the bank 4 is used in the task 3.

In the example of FIG. 7, finally, the microcomputer turns off the power temporarily and stops the operation. Before the microcomputer stops, the evacuation task is executed to evacuate the data of a general-purpose register on the periphery of the CPU to a memory, or to evacuate the data in a cache to a memory if the microcomputer is provided with the cache.

Before Time t1, the power of the memory control circuit 4 is off, accordingly, the values of all the control registers (the control registers 11, 21, 31, and 41 illustrated in FIGS. 2-5) are set to "0." The microcomputer is booted by switching on the power at Time t1. The memory control circuit 4 sets all the control registers 11_0-11_4, provided hardware-wise in the usable memory region assigning unit 10 illustrated in FIG. 2, to the state of power ON (Aon="1" and Asb="0") after the reset cancel. As a result, the logical value of the ON signal for the bank 2 outputted from the mode signal generating circuit 71_2 illustrated in FIG. 2 is set to "1", and the logical value of the standby signal Ssb is set to "0." Accordingly, the power mode of the bank 2 changes to the normal mode (power ON). By setting each memory bank as the normal mode, the CPU 2 can read and execute an initial boot program stored in one of the memory banks.

At Time t2 after the power is switched on, the CPU 2 does not access the memory bank 2 in the boot task; accordingly, the CPU 2 sets the corresponding control register 11_2 of the usable memory region assigning unit 10 as the power OFF (the ON assignment value Aon="0" and the standby assignment value Asb="0"). As a result, both the ON signal Son and the standby signal Ssb which are outputted from the mode signal generating circuit 71_2 of FIG. 2 corresponding to the bank 2 are set to "0", and the power mode of the bank 2 changes to the power shutdown mode (power OFF).

Furthermore, as explained with reference to FIG. 6, since the memory bank 2 stores the instruction, the CPU 2 sets "1" to the control register 21_2 corresponding to the bank 2 of the instruction address determination unit 20 of FIG. 3, and sets "1" to the control register 41_2 corresponding to the bank 2 of the branch determination unit 40 of FIG. 5. By this setting, the determination result of the determination units 20 and 40 to the bank 2 becomes valid. On the other hand, since the memory bank 2 does not store data, the CPU 2 sets "0" to the control register 31_2 corresponding to the bank 2 of the instruction decode determination unit 30 illustrated in FIG. 4. By this setting, the determination result to the bank 2 of the instruction decode determination unit 30 becomes invalid.

In the task 1 after Time t5, the memory bank 2 is used, accordingly, at Time t3 before the execution of the task 1, the CPU 2 sets the corresponding control register 11_2 of the usable memory region assigning unit 10 of FIG. 2 as the standby mode (the ON assignment value Aon="0" and standby assignment value Asb="1"). As a result, the ON signal Son outputted from the mode signal generating circuit 71_2 of FIG. 2 corresponding to the bank 2 is set to "0", the standby signal Ssb is set to "1", and the power mode of the bank 2 changes to the standby mode (S).

A branch instruction is executed in shifting to the task 1; accordingly, the branch instruction detector 42 of the branch determination unit 40 illustrated in FIG. 5 detects a branch instruction at Time t4. As a result, the branch determination circuit 44_2 for the bank 2 outputs "1" as the branch determination result. By this setting, the power mode of the bank 2 changes to the normal mode (power ON).

When the task 1 is executed at Time t5, the access address for the instruction fetch changes to the memory bank 2. Therefore, the instruction address determination circuit 26_2 corresponding to the bank 2 in the instruction address determination unit 20 illustrated in FIG. 3 outputs "1" as the determination result. As a result, the power mode of the bank 2 maintains the normal mode (power ON). During the execution of the task 1 (till Time t7), instructions stored in the memory bank 2 are continuously read; accordingly, the corresponding instruction address determination circuit 26_2 of the instruction address determination unit 20 illustrated in FIG. 3 outputs "1" as the determination result. As a result, the power mode of the bank 2 maintains the normal mode (power ON).

In this way, as to a memory bank to be accessed, the power mode of the memory bank is set as the standby before the access and changes to the power ON (normal mode) subsequently. Therefore, a latency time does not occur in the memory access, and hence it is possible to perform the power control without deterioration in the processing capability.

After shifting to the task 2 at Time t7, before Time t9 (Time t8 of FIG. 8) when an instruction access crosses from the memory bank 2 to the memory bank 3, both determination outputs of the instruction address determination circuits 26_2 and 26_3, respectively corresponding to the memory banks 2 and 3 of the instruction address determination unit 20 illustrated in FIG. 3, are set as "1." As a result, the power modes of the memory banks 2 and 3 both change to the normal mode (power ON).

After the instruction access shifts to the memory bank 3 (after Time t9), the determination result of the instruction address determination circuit 26_2 corresponding to the memory bank 2 of the instruction address determination unit 20 illustrated in FIG. 3 is set to "0." As a result, the power mode of the memory bank 2 changes to the standby mode (Son="0" and Ssb="1").

In the task 3 after Time t10, the CPU 2 does not access the memory bank 2. Therefore, at the time of shifting to the task 3, the CPU 2 sets the power OFF (Aon="0" and Asb="0") to the corresponding control register 11_2 of the usable memory region assigning unit 10 illustrated in FIG. 2. As a result, the ON signal Son and the standby signal Ssb which are outputted from the mode signal generating circuit 71_2 of FIG. 2 corresponding to the bank 2 are both set to "0", and the power mode of the bank 2 changes to the power shutdown mode (power OFF).

In the following task 4 (after Time t12), the memory bank 2 is used. Accordingly, at Time t11 before the execution of the task 4, the CPU 2 sets the corresponding control register 11_2 of the usable memory region assigning unit 10 of FIG. 2 as the standby mode (the ON assignment value Aon="0" and the standby assignment value Asb="1"). As a result, the power mode of the bank 2 changes to the standby mode (the ON signal Son="0" and the standby signal Ssb="1").

A branch instruction is executed at Time t13 during the execution of the task 4; accordingly the branch instruction detector 42 of the branch determination unit 40 illustrated in FIG. 5 detects a branch instruction. As a result, the branch determination circuit 44_2 for the bank 2 outputs "1" as the branch determination result. By this setting, the power mode of the bank 2 changes to the normal mode (power ON). After the execution of the branch instruction (after Time t14), the access address for the instruction fetch changes to the memory bank 2; accordingly, the instruction address determination circuit 26_2 corresponding to the bank 2 in the instruction address determination unit 20 illustrated in FIG. 3 outputs "1" as the determination result. As a result, the power mode of the bank 2 maintains the normal mode (power ON).

At Time t15, the S/W operation shifts to the evacuation task. In the evacuation task, the CPU 2 does not access to the memory bank 2. Accordingly, the CPU 2 sets the power mode of the corresponding control register 11_2 of the usable memory region assigning unit 10 as the power OFF mode (the ON assignment value Aon="0" and the standby assignment value Asb="0"). As a result, the ON signal Son and the standby signal Ssb which are outputted from the mode signal generating circuit 71_2 of FIG. 2 corresponding to the bank 2 are both set to "0", and the power mode of the bank 2 changes to the power shutdown mode (power OFF).

Figure 8:
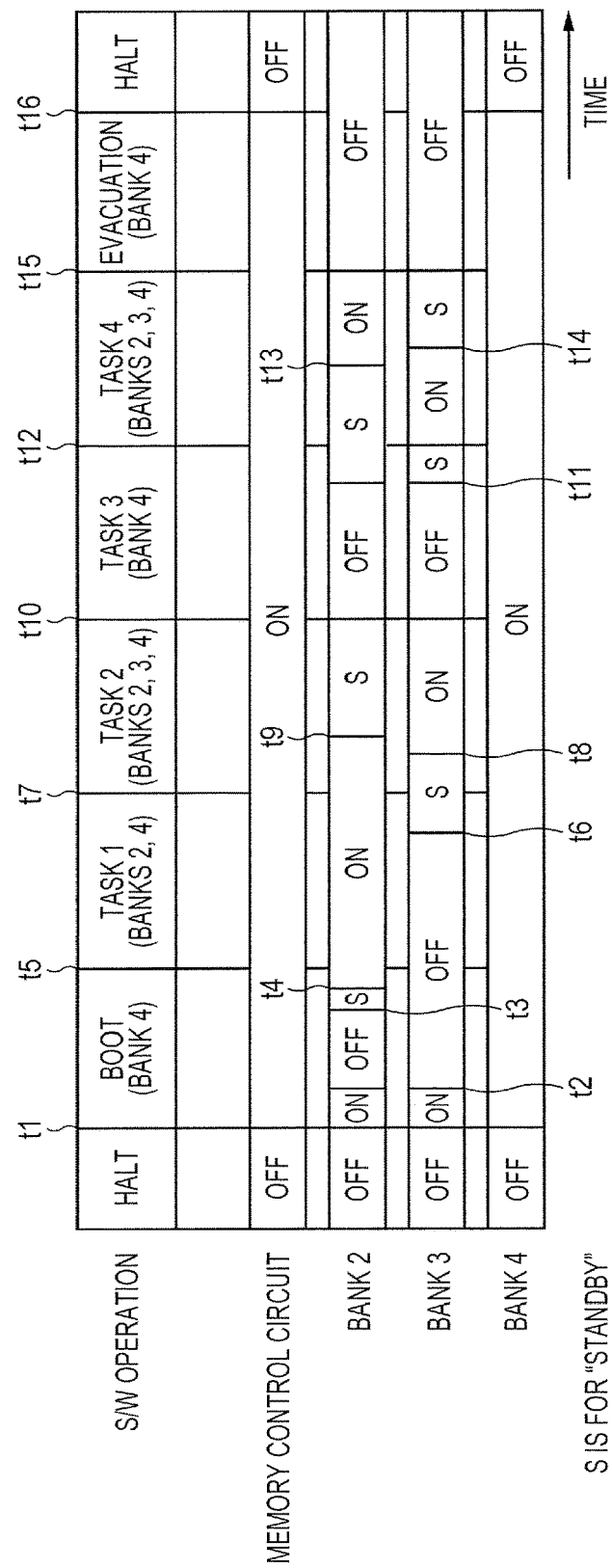
FIG. 8 is a timing chart illustrating a change of a power supply voltage supplied to a memory control circuit and each memory bank.

FIG. 8 is a timing chart illustrating a change of a power supply voltage supplied to the memory control circuit and each memory bank. In FIG. 7 and FIG. 8, the same reference symbol is attached to the identical time.

As illustrated in FIG. 8, the normal voltage is supplied (power ON) to the memory control circuit 4 illustrated in FIG. 1, from the boot task to the evacuation task. As for the banks 2, 3, and 4, the normal mode (power ON) has been always set in the past as in the memory bank 4. Instead in the present invention, a memory bank which is not accessed is set as the power shutdown mode (power OFF) for every program task, as in the case of the memory banks 2 and 3. Furthermore, the latency time of the memory access is prevented from occurring, by setting the standby mode to each bank in advance, before each bank is accessed.

Specifically, at Time t2 of FIG. 8, the CPU 2 sets the control registers 11_2 and 11_3 of the usable memory region assigning unit 10 illustrated in FIG. 2 as the power OFF by software control. As a result, the memory banks 2 and 3 change to the power OFF (power shutdown mode).

At Time t3, the CPU 2 sets the control register 11_2 of the usable memory region assigning unit 10 illustrated in FIG. 2 as the standby by software control. As a result, the memory bank 2 changes to the standby mode (S).

At Time t4, the branch determination unit 40 illustrated in FIG. 5 detects a branch instruction. As a result, the memory bank 2 changes to the power ON (normal mode).

At Time t6, the CPU 2 sets the control register 11_3 of the usable memory region assigning unit 10 illustrated in FIG. 2 as the standby by software control. As a result, the memory bank 3 changes to the standby mode (S).

After shifting to the task 2 at Time t7, before Time t9 (Time t8 of FIG. 8) when an instruction access crosses from the memory bank 2 to the memory bank 3, both determination outputs of the instruction address determination circuits 26_2 and 26_3, respectively corresponding to the memory banks 2 and 3 of the instruction address determination unit 20 illustrated in FIG. 3, are set to "1." As a result, the power modes of the memory banks 2 and 3 both change to the normal mode (power ON).

After Time t9, the access address for the instruction fetch shifts from the memory bank 2 to the memory bank 3. As a result, the determination result of the determination circuit 26_2 corresponding to the memory bank 2 of the instruction address determination unit 20 illustrated in FIG. 3 is set to "0." Accordingly, the memory bank 2 changes to the standby mode. The determination result of the determination circuit 26_3 maintains "1" from Time t8; accordingly, the memory bank 3 maintains the normal mode (power ON).

At Time t11, the CPU 2 sets the control registers 11_2 and 11_3 of the usable memory region assigning unit 10 illustrated in FIG. 2, as the standby by software control. As a result, the memory banks 2 and 3 change to the standby mode (S).

At Time t13, the branch determination unit 40 illustrated in FIG. 5 detects a branch instruction. As a result, the memory bank 2 changes to the power ON (normal mode).

After Time t14, the access address for the instruction fetch shifts from the memory bank 3 to the memory bank 2. As a result, the determination result of the determination circuit 26_3 corresponding to the memory bank 3 of the instruction address determination unit 20 illustrated in FIG. 3 is set to "0", and the determination result of the determination circuit 26_2 corresponding to the memory bank 2 is set to "1." Accordingly, the memory bank 3 changes to the standby mode and the memory bank 2 maintains the normal mode (power ON).

At Time t15, the CPU 2 sets the control registers 11_2 and 11_3 of the usable memory region assigning unit 10 illustrated in FIG. 2, as the power OFF by software control. As a result, the memory banks 2 and 3 change to the power shutdown mode (power OFF).

(Effect) As described above, for every program task, by turning off the power of a memory bank which is not accessed for an instruction fetch, it is possible to switch finely the power supply voltage supplied to the memory bank, thereby attaining the low power consumption.

In the instruction address determination unit 20 illustrated in FIG. 3, the address which is obtained by adding the prescribed address increment to the current access destination address may be an address of a memory bank which is not accessed actually. In the present case, in the usable memory region assigning unit 10, it is possible to prevent the power of the memory bank which is not accessed from being erroneously set to ON, by setting "0" in advance to the control register 11 corresponding to the memory bank which is not accessed.

2. An Example of the Operation to Data (Operand) Access

FIG. 9 is a timing chart illustrating an operation example of the memory control circuit to data (operand) access. In the data access, as is the case with the instruction access, the CPU 2 assigns, by software processing, which memory bank is to be accessed for each of the program tasks by means of the usable memory region assigning unit 10 illustrated in FIG. 2. In the example illustrated in FIG. 9, for data access, the bank 4 is used in a boot task (t21-t26), the bank 0 is used in a task 1 (t26-t31), the banks 0, 1, and 4 are used in a task 2 (t31-t34), the banks 1 and 4 are used in a task 4 (t36-41), and the banks 0 and 4 are used in an evacuation task (t41-t43). In FIG. 9, a memory access instruction is expressed by M and a non-memory-access instruction is expressed by N.

As illustrated in FIG. 1 and FIG. 9, since the memory bank 0 is used in the task 1, at Time t25 before the execution of the task 1, the CPU 2 sets the standby to the control register 11_0 of the usable memory region assigning unit 10 illustrated in FIG. 2. As a result, the power mode of the memory bank 0 changes to the standby mode (S).

At Time t27 during the execution of the task 1, when the memory access instruction detector 32 of the instruction decode determination unit 30 illustrated in FIG. 4 detects a memory access instruction, the determination output of the instruction decode determination circuit 36_0 corresponding to the memory bank 0 is set to "1." As a result, the power mode of the memory bank 0 changes to the normal mode (power ON).

Subsequently, at Time t28, when the non-memory-access instruction detector 35 illustrated in FIG. 4 detects a non-memory-access instruction continuously, the determination output of the instruction decode determination circuit 36_0 corresponding to the memory bank 0 is set to "0." As a result, the power mode of the memory bank 0 changes to the standby mode (S).

The memory bank 0 and the memory bank 1 are used in the task 2; accordingly, at Time t30 before the execution of the task 2, the CPU 2 sets the control registers 11_0 and 11_1 of the usable memory region assigning unit 10 illustrated in FIG. 2 as the standby. As a result, the power mode of the memory bank 1 changes to the standby mode. The memory bank 0 is already set as the normal mode (power ON) since the memory access instruction has been detected at Time t29.

At Time t32 during the execution of the task 2, when the memory access instruction detector 32 of the instruction decode determination unit 30 illustrated in FIG. 4 detects a memory access instruction, the determination output of the instruction decode determination circuits 36_0 and 36_1 respectively corresponding to the memory banks 0 and 1 are set to "1." As a result, the power mode of the memory banks 0 and 1 changes from the standby mode to the normal mode (power ON).

Subsequently, at Time t33, when the non-memory-access instruction detector 35 illustrated in FIG. 4 detects a non-memory-access instruction continuously, the determination output of the instruction decode determination circuits 36_0 and 36_1 respectively corresponding to the memory banks 0 and 1 are set to "0." As a result, the power mode of the memory banks 0 and 1 changes to the standby mode (S).

There is no data access in the task 3; accordingly, the CPU 2 sets the power OFF to the control registers 11_0 and 11_1 of the usable memory region assigning unit 10 illustrated in FIG. 2. As a result, the power mode of the memory banks 0 and 1 changes to the power shutdown mode (power OFF). There is an instruction access to the memory bank 4, accordingly, the memory bank 4 maintains the power ON assigned by the control register 11_4 of the usable memory region assigning unit 10 illustrated in FIG. 2.

The memory bank 1 is used in the task 4; accordingly, at Time t35 before the execution of the task 1, the CPU 2 sets the control register 11_1 of the usable memory region assigning unit 10 illustrated in FIG. 2 as the standby. As a result, the power mode of the memory bank 1 changes to the standby mode (S).

At Time t37 during the execution of the task 1, when the memory access instruction detector 32 of the instruction decode determination unit 30 illustrated in FIG. 4 detects a memory access instruction, the determination output of the instruction decode determination circuit 36_1 corresponding to the memory bank 1 is set to "1." As a result, the power mode of the memory bank 1 changes to the normal mode (power ON).

Subsequently, at Time t38, when the non-memory-access instruction detector 35 illustrated in FIG. 4 detects a non-memory-access instruction continuously, the determination output of the instruction decode determination circuit 36_1 corresponding to the memory bank 1 is set to "0." As a result, the power mode of the memory bank 1 changes to the standby mode (S).

(Effect) As described above, the power of the memory bank to which neither instruction access nor data access is performed is switched off for each of the program tasks, and occurrence of a data access is predicted by the instruction decode determination unit 30. Accordingly, it is possible to switch finely the power supply voltage supplied to the memory bank, thereby attaining the low power consumption.

Therefore, according to the present embodiment, in the instruction access and data access to a memory, the power control of a memory bank is performed for each of the program tasks; accordingly, compared with the power control of the memory bank in the past, it is possible to reduce the electric power of a memory in a fine and detailed manner. Furthermore, since an access destination is predicted and the power control is performed before memory access, it is possible to suppress the degradation of the access performance to a memory.

<A Modified Example>

In the explanation of FIG. 2-FIG. 7, the setup of the logic "1" and the logic "0" may be reversed (that is, it may be set up as "H" active or "L" active). When the setup of the logical value is reversed, an OR gate is changed to an AND gate and an AND gate is changed to an OR gate.

It should be understood by those skilled in the art that the embodiments disclosed in the present application are illustrative and not restrictive, with all the points of view. The scope of the present invention is illustrated not by the explanatory description given above but by the scope of the appended claims, and it is meant that various modifications and alterations may occur depending on design requirements and other factors insofar as they are within the scope of the appended claims or the equivalents thereof.

What is claimed is:

1. A memory control circuit for controlling a nonvolatile memory divided into a plurality of banks,
   wherein each of the banks has, as an operation mode, a normal mode in which access from a Central Processing Unit (CPU) is enabled, a standby mode in which power consumption is smaller than in the normal mode, and a shutdown mode in which power supply is shut down, and
   wherein the memory control circuit comprises:
   a first register group operable to store a plurality of first control values for the CPU to perform initial setting of the operation mode of the banks separately, for every task of a program executed by the CPU;
   an access determination unit operable to determine whether an access takes place from the CPU to each of the banks, based on an access address for instruction fetching and a kind of the fetched instruction; and
   a mode controller operable to switch the operation mode of each of the banks, based on the first control values and a determination result of the access determination unit,
   wherein the plurality of first control values for the CPU are stored for every task of the program executed by the CPU before the task of the program is actually executed by the CPU,
   wherein the mode controller is configured to:
   control a first bank, among the plurality of banks, to switch operation from the shutdown mode to the standby mode at a second time, in response to the access determination unit determining access to the first bank by the CPU is to take place in the task, prior to the task being actually executed by the CPU; and
   control the first bank to switch operation from the standby mode to the normal mode at a third time, in response to a determination of a branch instruction corresponding to the task currently executed by the CPU.

2. The memory control circuit according to claim 1,
   wherein the mode controller maintains the mode of a bank to which the normal mode has been initially set up by the first register group, irrespective of the determination result of the access determination unit, and
   wherein the mode controller switches the mode of a bank to which the standby mode has been initially set up by the first register group, to the normal mode when the access determination unit determines that an access by the CPU takes place.

3. The memory control circuit according to claim 2,
   wherein the access determination unit comprises:
   a first determination unit operable to determine a bank to which an access by the CPU takes place, based on a detection result of an access address for instruction fetching;
   a second determination unit operable to detect whether the fetched instruction is the branch instruction, and to determine whether an access from the CPU to each of the banks takes place, based on the detection result; and
   a third determination unit operable to detect whether the fetched instruction is a memory access instruction to access data stored in the nonvolatile memory, and to determine whether an access from the CPU to each of the banks takes place, based on the detection result.

4. The memory control circuit according to claim 3,
   wherein the first determination unit determines that an access by the CPU takes place to a bank corresponding to a current access address, and to a bank corresponding to an address given by adding a prescribed value to the current access address.

5. The memory control circuit according to claim 3,
   wherein the third determination unit determines that an access by the CPU takes place to each of the banks when the fetched instruction is the memory access instruction, and maintains the determination result of the access by the CPU until an instruction different from the memory access instruction is detected a prescribed number of times and consecutively.

6. The memory control circuit according to claim 3,
   wherein each of the first, the second, and the third determination unit includes a second register group operable to store a plurality of second control values respectively corresponding to the banks,
   wherein each of the first, the second, and the third determination unit determines whether an access by the CPU takes place and outputs the determination result, with respect to a bank corresponding to a register in which a first logical value has been set up as the second control value, and outputs always a determination result indicating that no access by the CPU takes place, with respect to a bank corresponding to a register in which a second logical value has been set up as the second control value.

7. The memory control circuit according to claim 2,
   wherein the CPU outputs a request signal asserted during an access to the nonvolatile memory,
   wherein the memory control circuit further comprises a fourth determination unit,
   wherein the fourth determination unit detects the request signal and an access address at a time of the CPU accessing the nonvolatile memory, and determines that, when the request signal is asserted, an access by the CPU takes place to a bank corresponding to a current access address, and
   wherein the mode controller sets the normal mode to a bank which the fourth determination unit has determined that an access by the CPU takes place, irrespective of a setting value of the first register group and the determination result of the access determination unit.

8. The memory control circuit according to claim 7,
   wherein, when the fourth determination unit determines that no access by the CPU takes place, the mode controller maintains the mode of a bank to which the shutdown mode has been set initially by the first register group, irrespective of the determination result of the access determination unit.

9. The memory control circuit according to claim 1, wherein the operation mode of the banks are initially set before the tasks of the program is actually executed by the CPU.

10. The memory control circuit according to claim 1, wherein before the access is actually performed for each task of the program, the memory control circuit assigns the mode of the first bank, among the plurality of banks, which is scheduled to be accessed by the respective task of the program, to be the normal mode or the standby mode and the mode of a second bank, among the plurality of banks, which is not scheduled to be accessed, to be the shutdown mode.

11. A memory control circuit for controlling a nonvolatile memory divided into a plurality of banks, each of the plurality of banks operating in one of operational modes, including a normal mode in which access from a Central Processing Unit (CPU) is enabled, a standby mode in which power consumption is smaller than in the normal mode, and a shutdown mode in which power supply is shut down, the memory control circuit comprises:

an assignment unit configured to assign a control value separately for each of the plurality of banks scheduled to be accessed by the CPU during execution of one or more tasks of a program by the CPU, the control value indicating one of the operational modes, in which, each of the plurality of banks will be operating when the CPU executes each of the one or more tasks, and the control values being assigned for each of the plurality of banks before the execution of the respective one or more task by the CPU to access the respective bank;

an access determination unit configured to determine whether an access takes place from the CPU to each of the plurality of banks; and a mode controller configured to switch an operation mode of each of the plurality of banks, based on the control value assigned to the respective bank and a determination result of the access determination unit, wherein the mode controller is further configured to:

control a first bank, among the plurality of banks, to switch operation from the shutdown mode to the standby mode at a second time, in response to the access determination unit determining access to the first bank by the CPU is to take place in the task, prior to the task being actually executed by the CPU; and control the first bank to switch operation from the standby mode to the normal mode at a third time, in response to a determination of a branch instruction corresponding to the task currently executed by the CPU.

12. The memory control circuit according to claim 11, wherein before the access is actually performed for each task of the program, the memory control circuit assigns the mode of the first bank, among the plurality of banks, which is scheduled to be accessed by the respective task of the program, to be the normal mode or the standby mode and the mode of a second bank, among the plurality of banks, which is not scheduled to be accessed, to be the shutdown mode.

* * * * *